(12) United States Patent
Aliakseyeu et al.

(10) Patent No.: US 11,589,445 B2
(45) Date of Patent: Feb. 21, 2023

(54) CONTROL SYSTEM FOR CONTROLLING ONE OR MORE LIGHTING DEVICES AND A METHOD THEREOF

(71) Applicant: SIGNIFY HOLDING B.V., Eindhoven (NL)

(72) Inventors: Dzmitry Viktorovich Aliakseyeu, Eindhoven (NL); Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 6 days.

(21) Appl. No.: 17/292,071

(22) PCT Filed: Oct. 28, 2019

(86) PCT No.: PCT/EP2019/079409
§ 371 (c)(1),
(2) Date: May 7, 2021

(87) PCT Pub. No.: WO2020/099110
PCT Pub. Date: May 22, 2020

(65) Prior Publication Data
US 2021/0410254 A1 Dec. 30, 2021

(30) Foreign Application Priority Data
Nov. 12, 2018 (EP) .................................. 18205648

(51) Int. Cl.
*H05B 47/155* (2020.01)

(52) U.S. Cl.
CPC ................................. *H05B 47/155* (2020.01)

(58) Field of Classification Search
CPC ....... H05B 47/155; H05B 45/20; Y02B 20/40
See application file for complete search history.

(56) References Cited

U.S. PATENT DOCUMENTS

| 9,686,842 B1 * | 6/2017 | Coombes ............... H05B 45/22 |
| 2010/0026734 A1 | 2/2010 | Kwisthout et al. |

(Continued)

FOREIGN PATENT DOCUMENTS

| WO | 03015477 A1 | 2/2003 |
| WO | 2015169157 A1 | 11/2015 |

(Continued)

*Primary Examiner* — Minh D A

(57) ABSTRACT

A method (700) of controlling one or more lighting devices (120, 122, 124) is disclosed. The method comprises: controlling (702) the one or more lighting devices (120, 122, 124) according to a dynamic light scene, wherein the dynamic light scene comprises first lighting control settings for controlling an intensity (i) of the light output of the one or more lighting devices (120, 122, 124), wherein the intensity changes over a time period (t), receiving (704) an input signal indicative of an activation of a second light scene during the time period, wherein the second light scene comprises one or more second lighting control settings for changing the light output of the one or more lighting devices (120, 122, 124), analyzing (706) the dynamic light scene to determine the change of the intensity of the light output of the one or more lighting devices (120, 122, 124) for an upcoming time period (u) after the activation (tx) of the second light scene, generating (708) a modified light scene based on the second light settings of the second light scene and the determined change of the intensity of the upcoming time period of the dynamic light scene, and controlling (710) the one or more lighting devices (120, 122, 124) according to the modified light scene during upcoming time period.

13 Claims, 7 Drawing Sheets

(56) References Cited

U.S. PATENT DOCUMENTS

| | | | |
|---|---|---|---|
| 2011/0035029 A1 | 2/2011 | Yianni et al. | |
| 2014/0277805 A1* | 9/2014 | Browne, Jr. | H05B 47/19 |
| | | | 315/291 |
| 2017/0163439 A1* | 6/2017 | Bosua | H05B 45/00 |
| 2018/0168020 A1* | 6/2018 | Casey | H04N 5/23245 |
| 2018/0235039 A1 | 8/2018 | Krajnc et al. | |

FOREIGN PATENT DOCUMENTS

| | | | | |
|---|---|---|---|---|
| WO | 2018037002 A1 | 3/2018 | | |
| WO | 2018052572 A1 | 3/2018 | | |
| WO | WO-2018054752 A1 * | 3/2018 | | H05B 37/0227 |

\* cited by examiner

CONTROL SYSTEM FOR CONTROLLING ONE OR MORE LIGHTING DEVICES AND A METHOD THEREOF

CROSS-REFERENCE TO PRIOR APPLICATIONS

This application is the U.S. National Phase application under 35 U.S.C. § 371 of International Application No. PCT/EP2019/079409, filed on Oct. 28, 2019, which claims the benefit of European Patent Application No. 18205648.1, filed on Nov. 12, 2018. These applications are hereby incorporated by reference herein.

FIELD OF THE INVENTION

The invention relates to a method of controlling one or more lighting devices and to a computer program product for executing the method. The invention further relates to a control system for controlling one or more lighting devices. The invention further relates to a controller for use in the control system.

BACKGROUND

Home and office lighting control systems enable users to control connected lamps. These lamps may be controlled based on user inputs received via a personal device, such as a smartphone, based on an actuation of a sensor, based on user-defined routines, based on audio or video streams, etc. Lamps may be controlled according to a dynamic light scene, the dynamic light scene comprising control settings for one or more lamps to change the light output of the one or more lamps over time. If such a dynamic light scene has been activated, and a user selects a new light scene, the new light scene overrules the dynamic light scene, resulting in that the lamps are controlled according to the new light scene.

SUMMARY OF THE INVENTION

The inventors have realized that overruling a dynamic light scene with a newly activated light scene may result in undesired behavior. A user may, for example, have selected a "go to sleep" light scene (e.g. a light scene with a predefined color, such as warm white, that gradually dims over a period of time). If a user would want to change the color of the light, e.g. to orange, the newly selected light scene (orange) would overrule the dynamic "go to sleep" light scene. This may lead to undesired behavior of the lighting system, because the orange light scene has overruled the dynamic effect of the dynamic light scene. It is therefore an object of the present invention to provide a lighting system that controls lighting devices according to dynamic light scenes in an improved way.

According to a first aspect of the present invention, the object is achieved by a method of controlling one or more lighting devices, the method comprising:
  controlling the one or more lighting devices according to a dynamic light scene, wherein the dynamic light scene comprises first lighting control settings for controlling an intensity of the light output of the one or more lighting devices, wherein the intensity changes over a time period,
  receiving an input signal indicative of an activation of a second light scene during the time period, wherein the second light scene comprises one or more second lighting control settings for changing the light output of the one or more lighting devices,
  analyzing the dynamic light scene to determine the change of the intensity of the light output of the one or more lighting devices for an upcoming time period after the activation of the second light scene,
  generating a modified light scene based on the second light settings of the second light scene and the determined change of the intensity of the upcoming time period of the dynamic light scene, and
  controlling the one or more lighting devices according to the modified light scene during upcoming time period.

By generating a (new) modified light scene for the upcoming time period based on the changes in intensity of the (currently active) dynamic light scene and based on the (newly) activated second light scene, the one or more lighting devices are controlled according to both the light scenes. The modified light scene may be generated by combining the dynamic light scene and the second light scene. The modified light scene may for example be generated by applying the changing intensity of the dynamic light scene to the second light scene. In another example, the modified light scene may be generated by applying the second light scene (e.g. a certain color, or a certain dynamic effect) to the dynamic light scene. Taking into account the intensity changes that are about to occur (during the upcoming time period, which may be a (part of) the remainder of the time period after the input signal has been received), is beneficial, because the characteristics of the dynamic light scene are conserved. Referring to the example mentioned above, wherein a user selects an orange color during a "go to sleep" light scene, the dynamic "go to sleep" light scene may be modified by applying the selected color (orange). As a result, the color of the "go to sleep" light scene is modified, whereas the change in intensity (gradual dimming) is maintained. The dynamic light scene may comprise, next to the change in intensity, a change in color. A change in color may be perceived by a user as a change in intensity. Therefore, in addition to the change in intensity, the change in color may be taken into account when the modified light scene is generated.

The second light scene may be a second dynamic light scene comprising second lighting control settings for controlling a second intensity of the light output of the one or more lighting devices, wherein the second intensity changes over a second time period. The second light scene may be a dynamic light scene as well, of which the intensity changes over a time period of the second light scene. The modified light scene may be based on the changes of the (first) intensity of the (first) dynamic light scene and based on the changes of the second intensity of the second dynamic light scene. This is beneficial, because intensity changes of both light scenes are taken into account while controlling the light. If one of the dynamic light scene or the second dynamic light scene would be stopped (e.g. by a user, based on a timer, based on a signal received from a lighting control application, etc.), the other dynamic light scene (i.e. the one that was not stopped) may be continued. In other words, the lighting device may be controlled according to that (original) dynamic light setting.

The method may further comprise: analyzing the second dynamic light scene to determine the change of the second intensity for the second time period, and the step of generating the modified light scene may comprise: generating the modified light scene such that the change of the intensity for the upcoming time period is relative to the change of the second intensity for the second time period, or vice versa.

The (first) dynamic light scene may, for example, be a dynamic light scene based on audio or video content (e.g. a pre-programmed light script or a light scene that is generated real-time based on the audio/video content). The second dynamic light scene may be a pre-programmed transitional light scene that dims the light level over time. Such a second dynamic light scene may be activated automatically in the evening (while the (first) dynamic light scene is active), when it is desirable that the amount of light gradually reduces over time (e.g. between 8 PM and 11 PM). The intensity change (gradual dimming) of the second dynamic light scene may be applied to the (first) dynamic light scene (or vice versa), resulting in a modified light scene wherein the one or more lighting devices are controlled dynamically according to the audio or video content (which is based on the (first) dynamic light scene), wherein the intensity is gradually reduced (which is based on the second dynamic light scene).

The method may further comprise: analyzing the dynamic light scene to determine a first number of peaks in the changing intensity for the upcoming time period, and analyzing the second light scene to determine a second number of peaks in the changing intensity for the second time period, and the step of generating the modified light scene may comprise: determining a number of peaks in the changing intensity for the modified light scene based on the first and second number. The number of peaks in a respective light scene may be indicative of a dynamicity level or a value indicating an amount of changes over the respective time period. The number of peaks for the modified intensity may, for example, be set such that it is substantially equal to the number of peaks of the upcoming time period, such that it is substantially equal to the number of peaks of the second time period, such that it is an average of the number of peaks of the upcoming time period and the number of peaks of the second time period, etc.

The second light scene may have a duration shorter than the upcoming time period, and the modified light scene may be generated such that its duration is longer than the duration of the second light scene or substantially equal to the upcoming time period. The second light scene may, for example, be a static light scene that occurs for a predefined time period. The second light scene may, for example, be a notification light scene (e g blinking the light once for notifying a user) which has a predefined (short) time period. The modified light scene may be generated such that the dynamic light scene continues after the notification, wherein, during a notification period of the notification light scene, the modified light scene may comprise the notification light scene, wherein the light intensity of the notification light scene may be based on the intensity of the dynamic light scene. In another example, the second light scene may be a second dynamic light scene shorter than the upcoming time period. The modified light scene may be generated such that the dynamic light scene continues after the duration of the second light scene.

The second light scene may have a duration shorter than the upcoming time period, and the modified light scene may be generated such that its duration is longer than the duration of the second light scene or substantially equal to the upcoming time period, and such that the modified light scene comprises an overlapping part wherein the dynamic light scene overlaps with the second light scene, and a non-overlapping time period wherein the dynamic light scene does not overlap with the second light scene, and such that, during the overlapping time period, the modified light scene is based on both the dynamic light scene and the second light scene, and such that, during the non-overlapping time period, the modified light scene is based on the dynamic light scene. In other words, if the second light scene is shorter than the upcoming time period (e.g. the remaining time period of the dynamic light scene), the first (overlapping) part of the modified light scene may be based on both the second light scene and the dynamic light scene, and the second (non-overlapping) part of the modified light scene may be based on the dynamic light scene.

The second light scene may have a duration shorter than the upcoming time period, and the modified light scene may be generated such that its duration is longer than the duration of the second light scene or substantially equal to the upcoming time period, and such that the modified light scene comprises an overlapping part wherein the dynamic light scene overlaps with the second light scene, and a non-overlapping time period wherein the dynamic light scene does not overlap with the second light scene, and such that, during the overlapping time period, the modified light scene is based on both the dynamic light scene and the second light scene, and such that, during the non-overlapping time period, the modified light scene is based on the dynamic light scene and based on one or more second lighting control settings of the second light scene. In other words, if the second light scene is shorter than the upcoming time period (e.g. the remaining time period of the dynamic light scene), both the first (overlapping) part and the second (non-overlapping) part of the modified light scene may be based on both the second light scene and the dynamic light scene.

The second light scene may have a duration longer than the upcoming time period, and the modified light scene may be generated such that its duration is shorter than the duration of the second light scene or substantially equal to the upcoming time period. The second light scene may, for example, be a dynamic light scene that occurs for a predefined time period longer than the upcoming time period, or even for an indefinite time period. The modified light scene may be generated such that its duration is set (substantially) equal to the original duration of the dynamic light scene. This is beneficial in embodiments wherein the dynamic light scene should not last longer than the original duration. The modified light scene may be based on the intensity changes of the second light scene that occur during the (full) duration of the second light scene (so also intensity changes that occur after the upcoming time period, i.e. a non-overlapping period). Alternatively, the modified light scene may be based on the intensity changes of the second light scene that occur during the upcoming time period (i.e. an overlapping period).

The second light scene may have a duration longer than the upcoming time period, and the modified light scene may be generated such that its duration is longer than the upcoming time period or substantially equal to the duration of the second light scene, and such that the modified light scene comprises an overlapping part wherein the dynamic light scene overlaps with the second light scene, and a non-overlapping time period wherein the second light scene does not overlap with the dynamic light scene, and such that, during the overlapping time period, the modified light scene is based on both the dynamic light scene and the second light scene, and such that, during the non-overlapping time period, the modified light scene is based on the second light scene and based on one or more second lighting control settings of the dynamic light scene. In other words, if the second light scene is longer than the upcoming time period (e.g. the remaining time period of the dynamic light scene), both the first (overlapping) part and the second (non-overlapping) part of the modified light scene may be based on both the second light scene and the dynamic light scene.

The input signal may be indicative of a selection of the second light scene via a user interface. A user may select the second light scene via a user interface. Upon said selection the modified light scene may be generated, and the one or more lighting devices may be controlled accordingly. This is beneficial, because it enables a user to select the second light setting and thereby modify the dynamic light setting.

The input signal may be indicative of a trigger of a sensor device. The input signal may be received from the sensor device (either directly or indirectly). The sensor device, e.g. a temperature sensor, a presence sensor, an audio sensor, a camera, a light sensor, a switch, etc. may trigger the second light scene.

The input signal may be indicative of an activation of a pre-programmed second light scene. The pre-programmed second light scene may, for example, be a pre-programmed routine, such as a "go to sleep" routine (e.g. dimming the light output of the one or more lighting devices over a period of time), a "wake-up routine" (e.g. increasing the light output of the one or more lighting devices over a period of time), a circadian rhythm routine (wherein the one or more lighting devices are controlled to mimic daylight), etc.

The dynamic light scene may comprise a first weight value and the second scene may comprise a second weight value, and the generation of the modified light scene may be further based on the first and second weight values. The weight values may, for example, be indicative of to what extent the respective light scene may be modified based on the other one. The weight value may for example be indicative of that a duration of the dynamic light scene is not to be modified (or not to be modified to a predefined extent), or for example that the light intensity of the modified light scene does not extend the maximum light output of the dynamic scene at the respective moment in time.

The method may further comprise:
receiving a user input via a user interface, wherein the user input is indicative of that the modified light scene is to be generated,
executing, if the user input has been received, the steps of analyzing, generating and controlling, or, if the user input has not been received, controlling the one or more lighting devices according to the second light scene or the dynamic scene. This is beneficial, because it enables a user to indicate whether the dynamic light scene is to be modified (or not).

The method may further comprise:
storing the modified light scene in a memory, or
storing a combination of the dynamic light scene and the modified light scene in a memory. This may be beneficial, because it may enable a user (or the lighting system) to retrieve the modified light scene or the combination of the dynamic light scene and the modified light scene from the memory for later use.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a control system for controlling one or more lighting devices, the control system comprising:
a lighting controller configured to control the one or more lighting devices according to a dynamic light scene, wherein the dynamic light scene comprises first lighting control settings for controlling an intensity of the light output of the one or more lighting devices,
a receiver configured to receive an input signal indicative of an activation of a second light scene during the time period, wherein the second light scene comprises one or more second lighting control settings for changing the light output of the one or more lighting devices, and
a processor configured to analyze the dynamic light scene to determine the change of the intensity of the light output of the one or more lighting devices for an upcoming time period after the activation of the second light scene, generate a modified light scene based on the second light settings of the second light scene and the determined change of the intensity of the upcoming time period of the dynamic light scene, and control the one or more lighting devices according to the modified light scene during upcoming time period.

According to a fourth aspect of the present invention, the object is achieved by a controller for use in the control system, wherein the controller comprises the receiver and the processor, and wherein the processor is configured to control the one or more lighting devices according to the modified light scene during upcoming time period by communicating the modified light scene to the lighting controller.

It should be understood that the computer program product, the control system and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
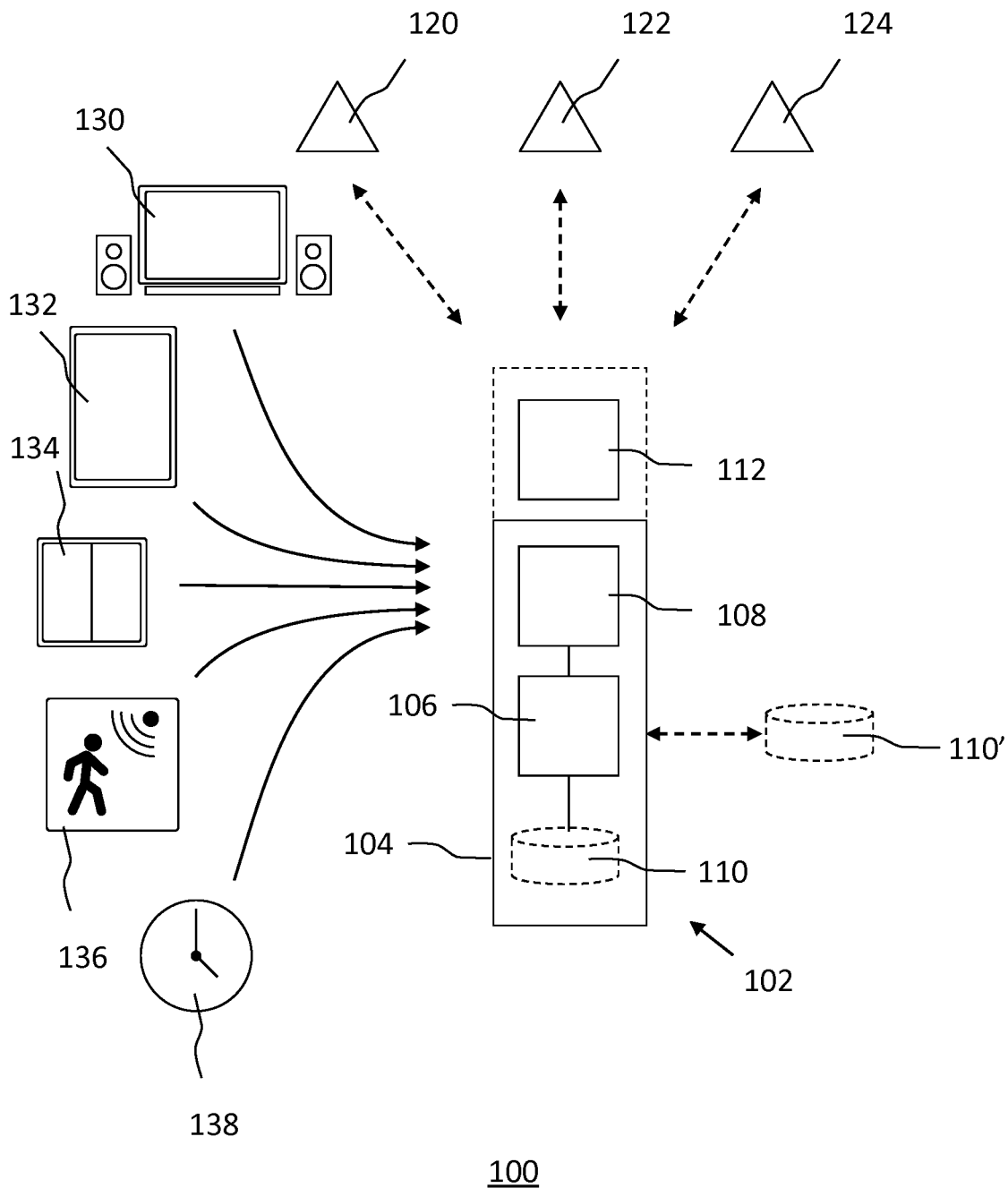
FIG. 1 shows schematically a lighting system comprising a control system for controlling one or more lighting devices based on a dynamic light scene and a second light scene.

FIG. 1 shows schematically a lighting system 100 comprising a control system 102 for controlling one or more lighting devices 120, 122, 124 based on a dynamic light scene and a second light scene. The lighting system 100 comprises a control system 102 for controlling the one or more lighting devices 120, 122, 124 which comprises a lighting controller 112 configured to control the one or more lighting devices 120, 122, 124 according to the dynamic light scene. The dynamic light scene comprises first lighting control settings for controlling an intensity of the light output of the one or more lighting devices 120, 122, 124, wherein the intensity changes over a time period. The control system 102 further comprises a receiver 108 configured to receive an input signal indicative of an activation of a second light scene during the time period of the dynamic light scene. The second light scene comprises one or more second lighting control settings for changing the light output of the one or more lighting devices 120, 122, 124. The control system further comprises a processor 106 configured to analyze the dynamic light scene to determine the change of the intensity of the light output of the one or more lighting devices 120, 122, 124 for an upcoming time period after the activation of the second light scene. The processor 106 is further configured to generate a modified light scene based on the second light settings of the second light scene and the determined change of the intensity of the upcoming time period of the dynamic light scene. The processor 106 is further configured to control the one or more lighting devices 120, 122, 124, for instance via the lighting controller 112, according to the modified light scene during upcoming time period.

The lighting controller 112 is configured to control the one or more lighting devices 120, 122, 124. The one or more lighting devices 120, 122, 124 may be configured to receive lighting control commands from the lighting controller 112, and to control their respective light sources based thereon. The one or more lighting devices 120, 122, 124 may comprise any type of light sources, such as LED or OLED light sources. The one or more lighting devices 120, 122, 124 may, for example, be an LED strip, an LED array or a light bulb. The light sources may be individually addressable light sources. The lighting controller 112 may be comprised, for example, in a smartphone, a bridge, a central building control system, etc. The lighting controller 112 may comprise a communication unit configured to communicate lighting control commands to the one or more lighting devices 120, 122, 124. The communication unit may comprise hardware for transmitting the lighting control command via any wired or wireless communication protocol. Various wired and wireless communication protocols may be used, for example Ethernet, DMX, DALI, USB, Bluetooth, Wi-Fi, Li-Fi, 3G, 4G, 5G or ZigBee.

The lighting controller 112 is configured to control the one or more lighting devices 120, 122, 124 according to a dynamic light scene. The dynamic light scene comprises first lighting control settings (e.g. control instructions) for controlling the one or more lighting devices 120, 122, 124 and to change the light output of the these one or more lighting devices 120, 122, 124 over a period of time. The lighting control settings may be control settings for individually addressable light sources of a lighting device such as an LED strip. The lighting controller 112 may, for example, communicate a plurality of control settings to the one or more lighting devices 120, 122, 124 over the period of time to change the light output (e.g. the color, saturation and/or the intensity). Alternatively, the lighting controller 112 may communicate the dynamic light scene to the one or more lighting devices 120, 122, 124, and the one or more lighting devices 120, 122, 124 may control their respective light outputs based on the received dynamic light scene.

Figure 2A:
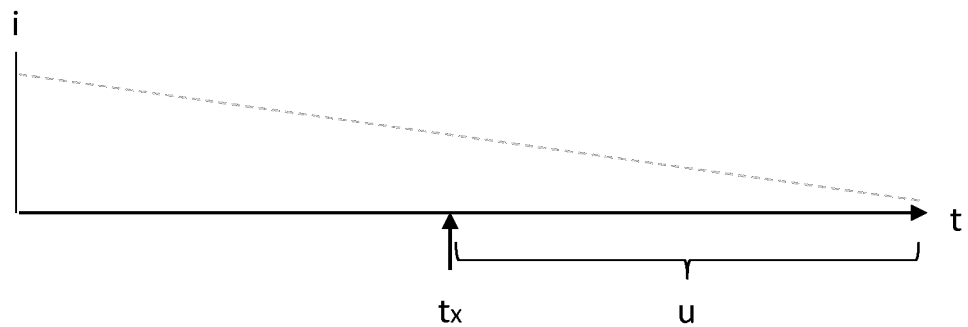
FIGS. 2a-2c show schematically an example of a timeline wherein a second light scene is applied to a dynamic light scene.

The dynamic light scene may comprise at least a changing intensity over the period of time. The intensity change over the period of time is visible/perceivable for a user. Additionally, the color, saturation, beam shape, beam width, etc. of the one or more lighting devices 120, 122, 124 may change over the period of time. A change of color or a change of saturation may be perceived as a change of intensity, and the change in color may therefore be used to determine the modified light scene. An example of a dynamic light scene is illustrated in FIG. 2a. This figure shows a dynamic light scene (the declining light grey dashed line) of which the intensity (i) changes over a period of time (t).

The control system 102 further comprises a processor 106 (e.g. circuitry, a microcontroller, a microchip, etc.) and a receiver 108 (e.g. an input). The processor 106 and the receiver 108 may be comprised in the same device as the lighting controller 112 (e.g. in a smartphone, a bridge, a central building control system, etc.). In embodiments, the processor 106 and the lighting controller 112 may be integrated in a single component, such as a microcontroller, microchip, etc. Alternatively, the processor 106 and the receiver 108 may be comprised in a separate control device 104. The control device 104 may, for example, be comprised in a first device (e.g. a smartphone, a remote server device, etc.) and the lighting controller 112 may be comprised in a second device (e.g. a bridge device, a second remote server, etc.). The controller 104 may be further configured to communicate with the lighting controller 112.

The receiver 108 is configured to receive an input signal indicative of an activation of a second light scene during the time period wherein the one or more lighting devices 120, 122, 124 are controlled based on the dynamic light scene. The second light scene comprises one or more second lighting control settings (control instructions) for changing the light output of the one or more lighting devices 120, 122, 124. The second light scene may be a static light scene (i.e. a light scene wherein the light output does not change) or a dynamic light scene (i.e. a light scene wherein the light output changes over time). The input signal may be received from any source configured to activate a light scene. FIG. 1 illustrates examples of sources from which the input signal may be received (either directly or indirectly).

In a first example, the input signal may be received from an audio or video rendering device 130, or received a software application associated with audio and/or video content to be rendered on the audio or video rendering device 130. The input signal may, for example, be communicated to the receiver when a user plays a movie or a song on the audio or video rendering device 130. The second light scene may be based on the audio and/or video content that is being rendered on the audio or video rendering device 130.

In a second example, the input signal may be indicative of a selection of the second light scene via a user interface. The input signal may be received from a user interface device. A user may select the second light scene via a user interface, for instance by selecting the second light scene on a touch sensitive display 132, or by providing a voice command to a smart speaker system or microphone for selecting the second light scene.

In a third example, the input signal may be input signal may be indicative of a trigger of a sensor device 134, 136. The input signal may for example be received from the sensor device 134, 136, either directly or indirectly. The sensor device, e.g. a temperature sensor, a presence sensor 136, an audio sensor, a camera, a light sensor, a switch 134, etc. may trigger the second light scene, which trigger may be indicative of the input signal. A user may, for example, press a switch 134 to select a second light scene. Alternatively, the second light scene may be activated when a user triggers a presence sensor, or when a temperature sensor or light senses provides a sensor value that exceeds a threshold, etc.

In a fourth example, the input signal may be indicative of an activation of a pre-programmed second light scene. The pre-programmed second light scene may, for example, be a pre-programmed routine, such as a "go to sleep" routine (e.g. dimming the light output of the one or more lighting devices over a period of time), a "wake-up routine" (e.g. increasing the light output of the one or more lighting devices over a period of time), a circadian rhythm routine (wherein the one or more lighting devices are controlled to mimic the daylight), etc. The pre-programmed second light scene may for instance be triggered by an (internal) clock 138, or by a lighting control software application.

It should be understood that the above-mentioned examples of input signals are mere examples, and that the skilled person will be able to design alternative input signals without departing from the scope of the appended claims.

The processor 106 is configured to analyze the dynamic light scene and to determine the change of the intensity of the light output of the one or more lighting devices 120, 122, 124 for an upcoming time period of the dynamic light scene after/upon the activation of the second light scene. The upcoming period may be the remaining time period of the dynamic light scene. Alternatively, the upcoming time period may be a part of the remaining time period of the dynamic light scene. An example of an upcoming time period has been illustrated in FIGS. 2b and 2c. This figure shows a moment in time ($t_x$) indicating the moment that the second light scene has been activated. In this example, the upcoming time period (u) is the remaining time period of the dynamic light scene of FIG. 2a.

Figure 2B:
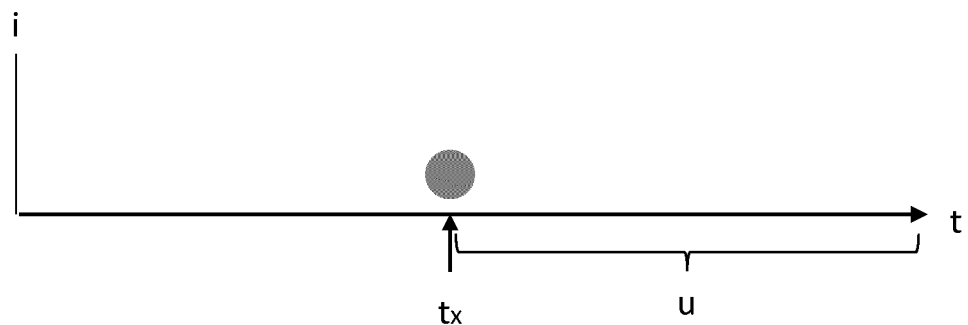
Figure 2C:
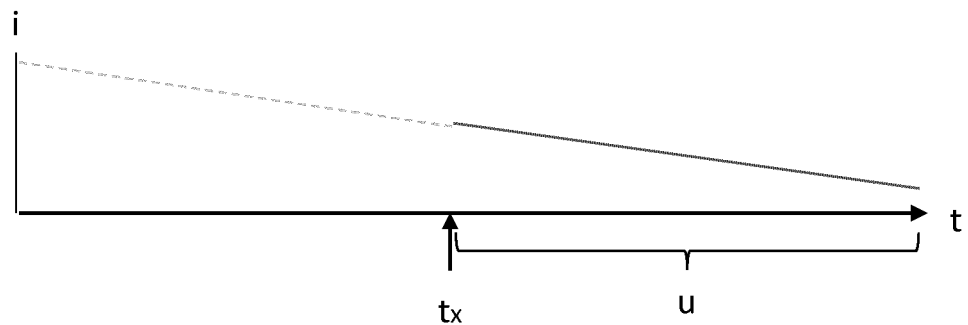

The processor 106 is further configured to generate a modified light scene based on the second light settings of the second light scene and the determined change of the intensity of the upcoming time period of the dynamic light scene, and control the one or more lighting devices according to the modified light scene, at least during upcoming time period. The processor 106 may generate the modified light scene by combining the changing intensity of the dynamic light scene with the second light scene. The modified light scene may for example be generated by applying the changing intensity of the dynamic light scene to the second light scene. In another example, the modified light scene may be generated by applying the second light scene (e.g. a certain color, or a certain dynamic light effect) to the dynamic light scene. An example is illustrated in FIGS. 2b and 2c. FIG. 2b shows that a second light scene is selected at $t_x$. In this example, the second light scene may have a different color (e.g. blue, illustrated as a dark grey dot in FIG. 2b) than the dynamic light scene (e.g. yellow, illustrated as the light grey dashed line in FIG. 2a). The processor 106 may generate the modified light scene (illustrated as the dark grey solid line in FIG. 2c) based on the change of intensity of the dynamic light scene during the upcoming time period (u) and the second light scene (i.e. the color change). As a result the processor 106 may control the one or more lighting devices 120, 122, 124 according to the second modified light setting, which in this example would result in a blue-colored light output of which the intensity decreases over the upcoming period of time (u).

The second light scene may be a second dynamic light scene, and the processor 106 may be configured to generate the modified light scene based on the second dynamic light scene and the (first, initial) dynamic light scene. FIGS. 3a-3d, 4a-4c, 5a-5e and 6a-6b illustrate examples of generation of the modified light scene based on two dynamic light scenes.

Figure 3A:
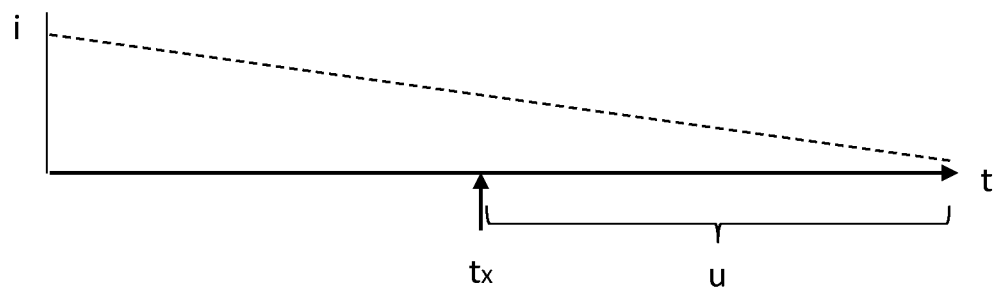
FIGS. 3a-3d show schematically an example of a timeline wherein a second dynamic light scene is applied to a first dynamic light scene.
Figure 3B:
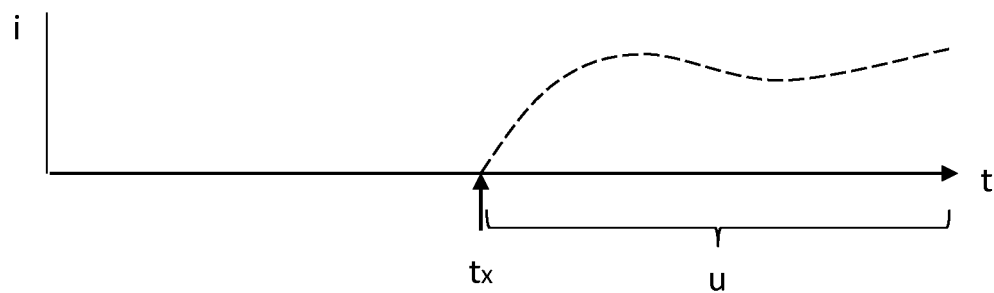
Figure 3C:
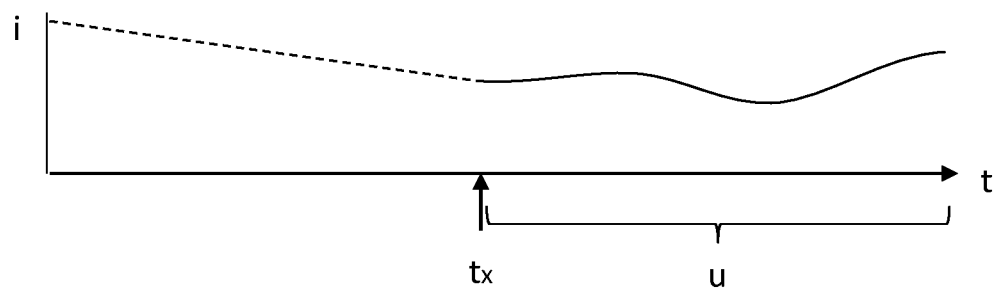
Figure 3D:
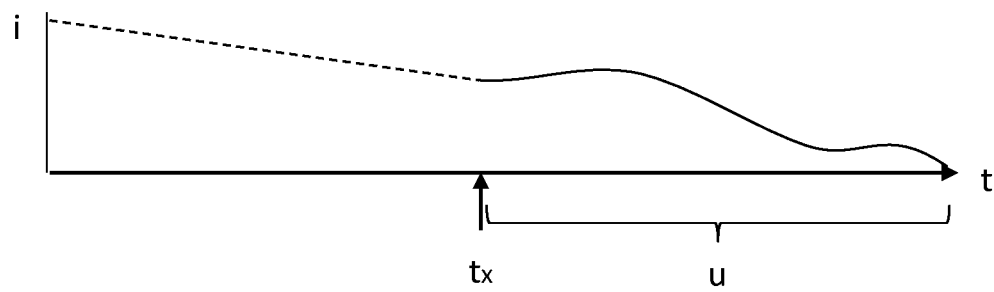

The processor 106 may be further configured to analyze the second dynamic light scene to determine the change of the second intensity for the second time period, which may start at the moment of receiving the input signal ($t_x$), and generate the modified light scene such that the change of the intensity for the upcoming time period is relative to the change of the second intensity for the second time period, or vice versa. As illustrated in FIGS. 3a-3d, the dynamic light scene (illustrated in FIG. 3a as a first dashed line) may be a light scene wherein the intensity (i) gradually decreases over time (t). The second dynamic light scene (illustrated in FIG. 3b as a second dashed line) may be a light scene wherein the intensity (i) follows a curve that first increases, then decreases and finally increases again. In a first example, as illustrated in FIG. 3c, the processor 106 may combine the dynamic light scene of FIG. 3a and the second dynamic light scene of FIG. 3b such that the second dynamic light scene is more dominant (the second dynamic light scene may for example have a weight value assigned to it that is higher than a weight value of the dynamic light scene), resulting in that the modified light scene (illustrated as a solid line in FIG. 3c) is more similar to the second dynamic light scene. As a result, the intensity level at the end of the upcoming time period (u) is substantially similar to the intensity level at the end of the second dynamic light scene. In a second example, as illustrated in FIG. 3d, the processor 106 may combine the dynamic light scene of FIG. 3a and the second dynamic light scene of FIG. 3b such that the dynamic light scene is more dominant (the dynamic light scene may for example have a weight value assigned to it that is higher than a weight value of the second dynamic light scene), resulting in that the modified light scene (illustrated as a solid line in FIG. 3d) is more similar to the dynamic light scene. As a result, the intensity level at the end of the upcoming time period (u) is substantially similar to the intensity level at the end of the dynamic light scene.

In a further example (not shown), weight values of the dynamic light scene and the second dynamic light scene may be substantially equal, and the processor 106 may generate the modified light scene such that the intensity level during the upcoming period of time and/or at the end of the upcoming time period (u) is an average of the intensity levels of the light scenes.

The processor 106 may be further configured to analyze the dynamic light scene to determine a first number of peaks in the changing intensity for the upcoming time period, and to analyzing the second (dynamic) light scene to determine a second number of peaks in the changing intensity for the second time period. The processor 106 may be further configured to generate the modified light scene by determining a number of peaks in the changing intensity for the modified light scene based on the first and second number.

Figure 4A:
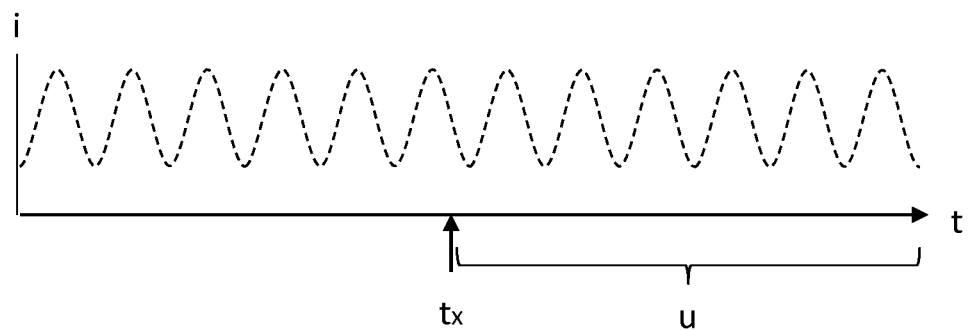
FIGS. 4a-4c show schematically examples of a timeline wherein a second dynamic light scene is applied to a first dynamic light scene, wherein the second dynamic light scene has a higher amount of intensity peaks than the first dynamic light scene.
Figure 4B:
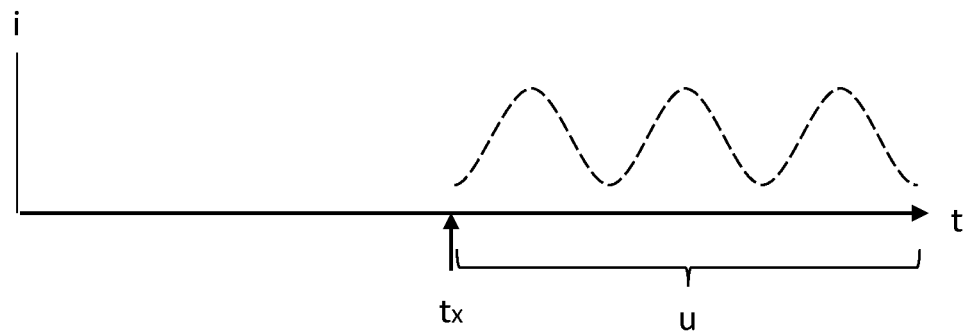
Figure 4C:
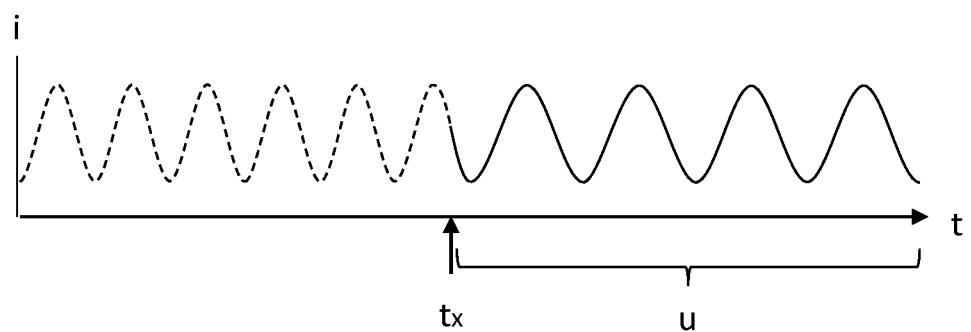

As illustrated in FIGS. 4a-4c, the dynamic light scene (illustrated in FIG. 4a as a first dashed line) may be a light scene comprising a first number of peaks during the upcoming time period. The second dynamic light scene (illustrated in FIG. 4b as a second dashed line) may be a light scene comprising a second number of peaks (in this example lower than the number of peaks than the dynamic light scene). The processor 106 may, for example, generate the modified light scene (illustrated in FIG. 4c as a solid line) such that it comprises a number of peaks that is an average of the first number and the second number. Alternatively (not shown), the processor 106 may for example generate the modified light scene such that the number of peaks is based on weight values assigned to the dynamic light scene and the second dynamic light scene. If, for example, the dynamic light scene has a higher weight value than the second dynamic light scene, the number of peaks of the modified light scene may be closer or substantially equal to the number of peaks of the dynamic light scene. In these examples, the intensity changes are repetitive, but it should be understood that the light scenes may comprise any number and/or types of peaks.

It may occur that the second light scene has a duration that is shorter than the upcoming time period (u). The second light scene may, for example, be a static notification light scene (e.g. blinking the light for notifying a user) which has a predefined (short) time period. In another example, the second light scene may be a dynamic light scene (e.g. a "go to sleep" light scene wherein the intensity gradually decreases over time) with a shorter duration than the dynamic light scene (e.g. an (infinite/indefinite) "fireplace" light scene wherein the intensity flickers/fluctuates over time). The processor 106 may be configured to generate the modified light scene such that its duration is longer than the duration of the second light scene or substantially equal to the upcoming time period. As illustrated in FIGS. 5a-5e, the dynamic light scene (illustrated in FIG. 5a as a first dashed line) may be a light scene wherein the intensity (i) gradually decreases over time (t). The second dynamic light scene (illustrated in FIG. 5b as a second dashed line) may be a second dynamic light scene having a duration (s) shorter than the upcoming time period (u). The processor 106 may, for example, generate the modified light scene (illustrated in FIG. 5c as a solid line) such that it is based on the dynamic light scene and the second dynamic light scene, wherein the duration of the modified light scene is equal to the duration (s) of the second dynamic light scene.

Figure 5A:
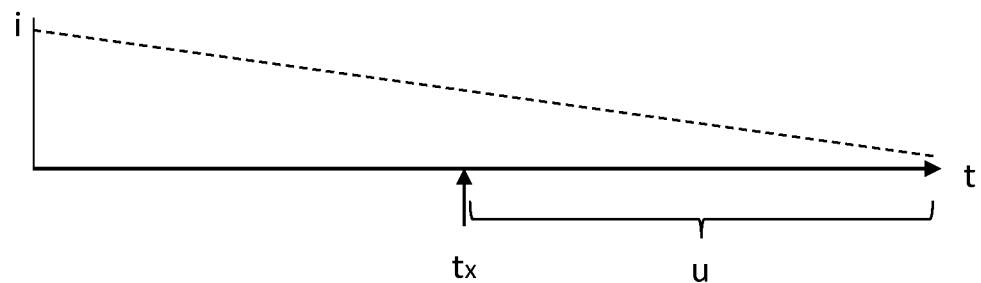
FIGS. 5a-5e show schematically examples of a timeline wherein a second dynamic light scene is applied to a first dynamic light scene, wherein the second dynamic light scene has a duration shorter than the first dynamic light scene.
Figure 5B:
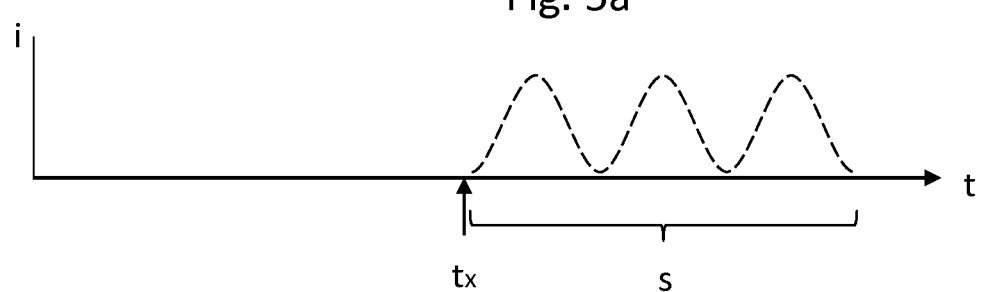
Figure 5C:
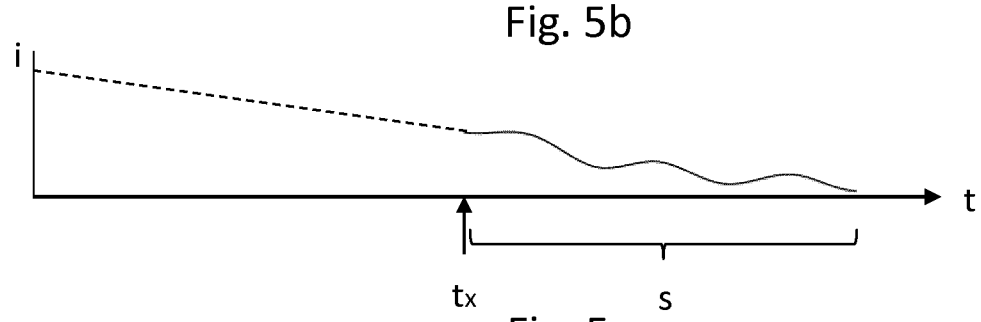
Figure 5D:
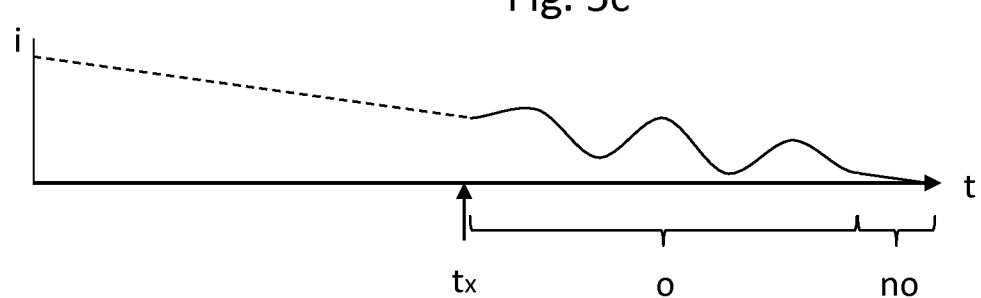
Figure 5E:
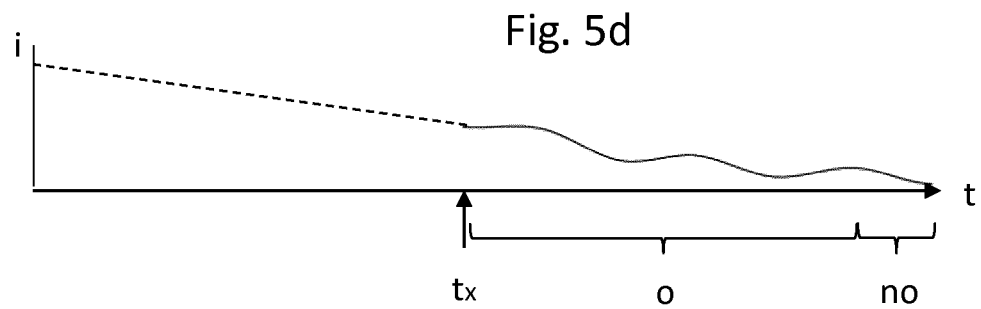

Alternatively, the processor 106 may generate the modified light scene such that its duration is longer than the duration of the (shorter) second light scene or substantially equal to the upcoming time period. As a result, the modified light scene comprises an overlapping part wherein the dynamic light scene overlaps with the second light scene, and a non-overlapping time period, wherein the dynamic light scene does not overlap with the second light scene. The processor 106 may generate the modified light scene such that, during the overlapping time period, the modified light scene is based on both the dynamic light scene and the second light scene, and such that, during the non-overlapping time period, the modified light scene is based on the dynamic light scene. This is illustrated in FIGS. 5d and 5e. In these figures, the dynamic light scene (illustrated in FIG. 5a as a first dashed line) may be a light scene wherein the intensity (i) gradually decreases over time (t). The second dynamic light scene (illustrated in FIG. 5b as a second dashed line) may be a second dynamic light scene having a duration (s) shorter than the upcoming time period (u). The processor 106 may generate the modified light scene (illustrated in FIGS. 5d and 5e as a solid line) such that it has a duration substantially equal to the upcoming time period (u). As a result, the modified light scene may comprise an overlapping time period (o) wherein the dynamic light scene overlaps with the second dynamic light scene, and a non-overlapping time period (no) wherein the dynamic light scene does not overlap with the second dynamic light scene. The processor 106 may generate the modified light scene such that the light setting that are to be rendered by the one or more lighting devices during the non-overlapping time period (no) are based on the dynamic light scene (only). This is illustrated in FIG. 5d, wherein the decline in intensity of during the non-overlapping time period (no) is the same as the decline in intensity of the dynamic light scene during the same time period of the dynamic light scene.

Alternatively, the processor 106 may generate the modified light scene such that the lighting settings that are to be rendered by the one or more lighting devices during the non-overlapping time period (no) are based on both the dynamic light scene and one or more second lighting control settings of the second light scene. This is illustrated in FIG. 5e, wherein the change in intensity during the overlapping time period and the (o) during the non-overlapping time period (no) is based on the second dynamic light scene and the dynamic light scene. In other words, the (shorter) second dynamic light scene may be stretched such that its duration is substantially equal to upcoming time period of the (longer) dynamic light scene. The processor 106 may then generate the modified light scene based on the stretched second dynamic light scene and the dynamic light scene, resulting in the modified light scene as indicated by the solid line in FIG. 5e.

It may occur that the second light scene has a duration longer than the upcoming time period. The second light scene may, for example, be a second dynamic light scene based on music content (e.g. a light scene of which the intensity is controlled based on a characteristics of the music), and the dynamic light scene may be a shorter light scene (e.g. a "go to sleep" light scene wherein the intensity gradually decreases over time). The processor 106 may be configured to generate the modified light scene such that its duration is shorter than the duration of the second light scene or substantially equal to the upcoming time period. As illustrated in FIGS. 6a-6e, the dynamic light scene (illustrated in FIG. 6a as a first dashed line) may be a light scene wherein the intensity (i) gradually decreases over time (t). The second dynamic light scene (illustrated in FIG. 6b as a second dashed line) may be a second dynamic light scene having a duration (s) longer than the upcoming time period (u). The processor 106 may, for example, generate the modified light scene (illustrated in FIGS. 6c and 6d as a solid line) such that it is based on the dynamic light scene and the second dynamic light scene, wherein the duration of the modified light scene is substantially equal to the duration (s) of the second dynamic light scene.

Figure 6A:
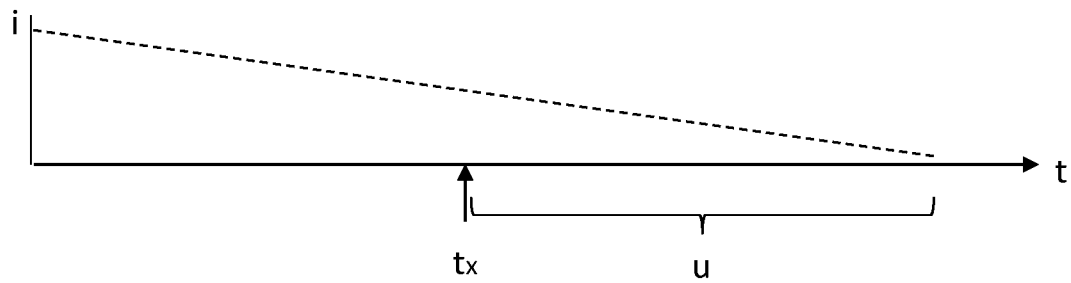
FIGS. 6a-6e show schematically examples of a timeline wherein a second dynamic light scene is applied to a first dynamic light scene, wherein the second dynamic light scene has a duration longer than the first dynamic light scene.
Figure 6B:
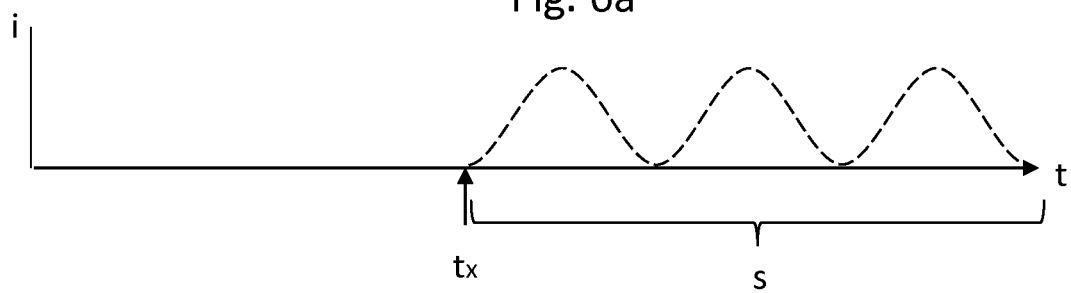
Figure 6C:
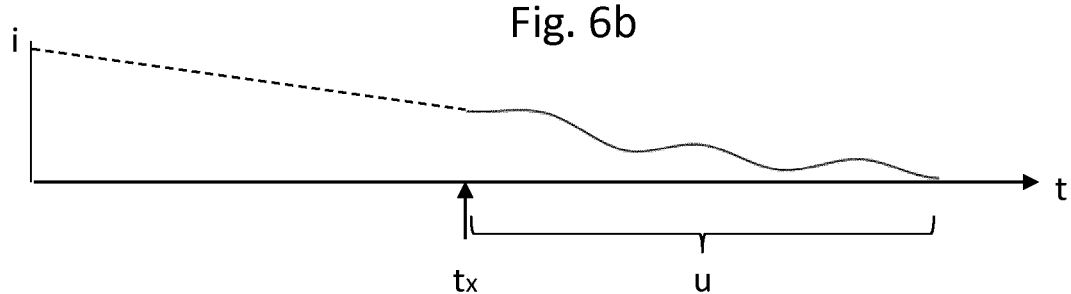

As illustrated in FIG. 6c, the processor 106 may generate the modified light scene such that the change of intensity of the modified light scene is based on the change of intensity during the (full) duration of the second dynamic light scene. In other words, the (longer) second dynamic light scene may be compressed such that its duration is substantially equal to upcoming time period of the (shorter) dynamic light scene. The processor 106 may then generate the modified light scene based on the compressed second dynamic light scene and the dynamic light scene, resulting in the modified light scene as indicated by the solid line in FIG. 6c.

Figure 6D:
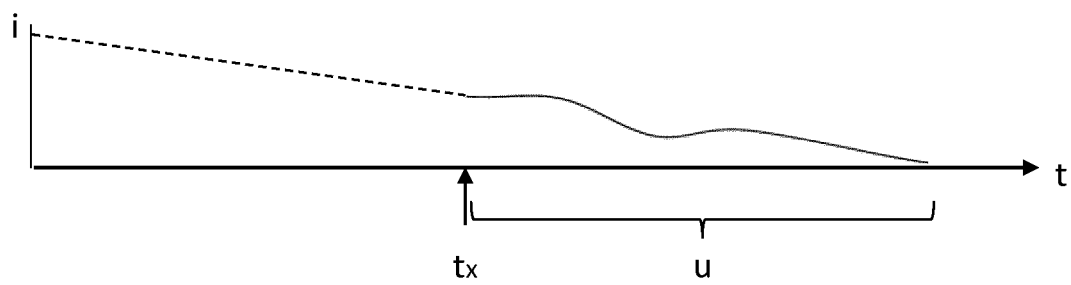

Alternatively, as illustrated by the solid line in FIG. 6d, the processor 106 may generate the modified light scene such that the change of intensity of the modified light scene is based on the change of intensity of the second dynamic light scene during the upcoming time period (u). In other words, only the intensity changes of the second dynamic light scene that occur during the upcoming time period (u) are taken into account for the generation of the modified light scene.

Figure 6E:
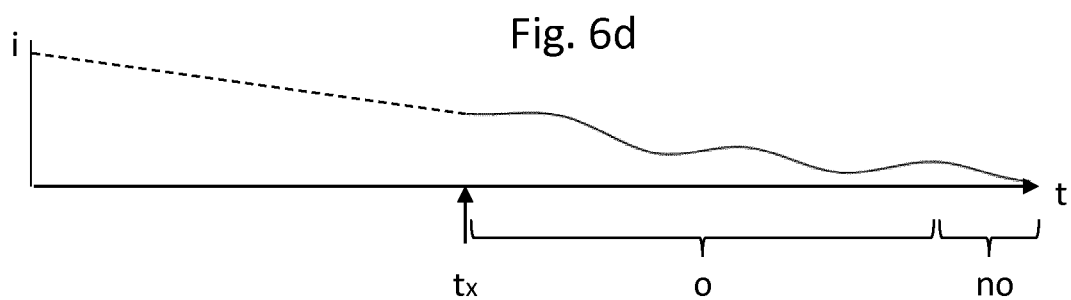

Alternatively, the processor 106 may generate the modified light scene such that its duration is longer than the upcoming time period or substantially equal to the duration of the second scene. As a result, the modified light scene comprises an overlapping part wherein the second light scene overlaps with the dynamic light scene, and a non-overlapping time period wherein the second light scene does not overlap with the dynamic light scene. The processor 106 may generate the modified light scene such that, during the overlapping time period, the modified light scene is based on both the dynamic light scene and the second light scene, and such that, during the non-overlapping time period, the modified light scene is based on the second light scene and based on one or more second lighting control settings of the dynamic light scene. This is illustrated in FIG. 6e. The processor 106 may generate the modified light scene such that it has a duration substantially equal to the duration of the second dynamic light scene (s). As a result, the modified light scene may comprise an overlapping time period (o) wherein the second dynamic light scene overlaps with the dynamic light scene, and a non-overlapping time period (no) wherein the second dynamic light scene does not overlap with the dynamic light scene. The processor 106 may generate the modified light scene such that the lighting settings that are to be rendered by the one or more lighting devices during the non-overlapping time period (no) are based on both the dynamic light scene of FIG. 6a, and the second dynamic light scene of FIG. 6b, as is illustrated in FIG. 6e as a solid line.

The processor 106 may be further configured to obtain and/or assign weight values to the dynamic light scene and the second light scene. The dynamic light scene may comprise a first weight value and the second scene may comprise a second weight value. The processor 106 may be further configured to generate the modified light scene based on the first and second weight values. A weight value may, for example, be indicative of to what extent a respective light scene may be modified based on the other one. The weight value may for example be indicative of that a duration of the dynamic light scene is not to be modified (or not to be modified to a predefined extent), or that the light intensity of the modified light scene does not extend a maximum light output of the dynamic scene at a certain/respective moment in time, etc. The weight value may further be indicative of that the respective light scene is not to be modified. Thus, if the dynamic light scene comprises a weight value indicative of that it is not to be modified, the processor 106 may then not apply the second light scene upon receiving the input signal indicative of the activation of the second light scene. Also, if the second light scene comprises a weight value indicative of that it is not to be modified, the processor 106 may activate the second light scene upon receiving the input signal indicative of the activation of the second light scene, and not apply the intensity change of the dynamic light scene to the second light scene.

The processor 106 may be further configured to receive a user input via a user interface (e.g. a touch sensitive display, a voice-controlled user interface, etc.), which user input is indicative of that the modified light scene is to be generated. The user input may be indicative of a confirmation that the dynamic light scene is to be combined with the second light scene. The processor 106 may be further configured to, if the user input has been received, generate the modified light scene, and control the one or more lighting devices 120, 122, 124 accordingly. The processor 106 may be further configured to, if the user input has not been received, control the one or more lighting devices 120, 122, 124 according to the second light scene or the dynamic scene. This is beneficial, because it enables a user to indicate whether the dynamic light scene is to be modified (or not).

The processor 106 may be further configured to store the modified light scene in a memory 110, 110', which may be located in the control system or remotely, for instance in a remote server accessible via a network/the internet. Additionally or alternatively, the processor 106 may be configured to store a combination of the dynamic light scene and the modified light scene in the memory 110, 110'. A user (or the lighting system) may later retrieve the modified light scene or the combination of the dynamic light scene and the modified light scene from the memory 110, 110' for later use.

Figure 7:
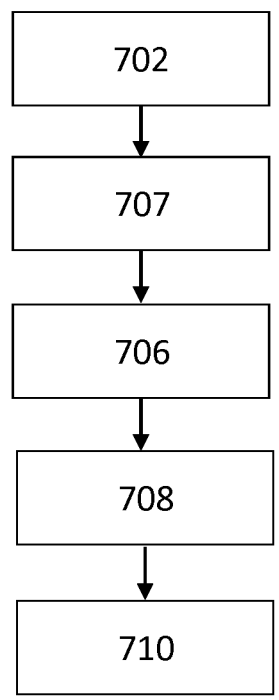
FIG. 7 shows schematically a method of controlling one or more lighting devices based on a dynamic light scene and a second light scene.

FIG. 7 shows schematically a method 700 of controlling one or more lighting devices 120, 122, 124 based on a dynamic light scene and a second light scene. The method 700 comprises:

controlling 702 the one or more lighting devices according to a dynamic light scene, wherein the dynamic light scene comprises first lighting control settings for controlling an intensity of the light output of the one or more lighting devices, wherein the intensity changes over a time period, receiving 704 an input signal indicative of an activation of a second light scene during the time period, wherein the second light scene comprises one or more second lighting control settings for changing the light output of the one or more lighting devices, analyzing 706 the dynamic light scene to determine the change of the intensity of the light output of the one or more lighting devices for an upcoming time period after the activation of the second light scene, generating 708 a modified light scene based on the second light settings of the second light scene and the determined change of the intensity of the upcoming time period of the dynamic light scene, and controlling 710 the one or more lighting devices according to the modified light scene during upcoming time period.

The method 700 may be executed by computer program code of a computer program product when the computer program product is run on a processing unit of a computing device, such as the control system 102 the lighting system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling one or more lighting devices, the method comprising:
   controlling the one or more lighting devices according to a dynamic light scene, wherein the dynamic light scene comprises first lighting control settings for controlling an intensity of the light output of the one or more lighting devices, wherein the intensity changes over a time period,
   receiving an input signal indicative of an activation of a second light scene during the time period, wherein the second light scene comprises one or more second lighting control settings for changing the light output of the one or more lighting devices,
   analyzing the dynamic light scene to determine the change of the intensity of the light output of the one or more lighting devices for an upcoming time period after the activation of the second light scene, the second light scene being a second dynamic light scene comprising second lighting control settings for controlling a second intensity of the light output of the one or more lighting devices, the second intensity changing over a second time period,
   analyzing the second dynamic light scene to determine the change of the second intensity for the second time period,
   generating a modified light scene by combining the dynamic light scene and the second light scene based on the second light settings of the second light scene and the determined change of the intensity of the upcoming time period of the dynamic light scene such that the change of the intensity for the upcoming time period is relative to the change of the second intensity for the second time period, or vice versa, and
   controlling the one or more lighting devices according to the modified light scene during upcoming time period.

2. The method of claim 1, further comprising:
   analyzing the dynamic light scene to determine a first number of peaks in the changing intensity for the upcoming time period,
   analyzing the second light scene to determine a second number of peaks in the changing intensity for the second time period,
   and wherein the step of generating the modified light scene comprises:
   determining a number of peaks in the changing intensity for the modified light scene based on the first and second number.

3. The method of claim 1, wherein the second light scene has a duration shorter than the upcoming time period, and wherein the modified light scene is generated such that its duration is longer than the duration of the second light scene or substantially equal to the upcoming time period.

4. The method of claim 1, wherein the second light scene has a duration shorter than the upcoming time period, and wherein the modified light scene is generated such that its duration is longer than the duration of the second light scene or substantially equal to the upcoming time period, and such that the modified light scene comprises an overlapping part wherein the dynamic light scene overlaps with the second light scene, and a non-overlapping time period wherein the dynamic light scene does not overlap with the second light scene, and such that, during the overlapping time period, the modified light scene is based on both the dynamic light scene and the second light scene, and such that, during the non-overlapping time period, the modified light scene is based on the dynamic light scene.

5. The method of claim 1, wherein the second light scene has a duration shorter than the upcoming time period, and wherein the modified light scene is generated such that its duration is longer than the duration of the second light scene or substantially equal to the upcoming time period, and such that the modified light scene comprises an overlapping part wherein the dynamic light scene overlaps with the second light scene, and a non-overlapping time period wherein the dynamic light scene does not overlap with the second light scene, and such that, during the overlapping time period, the modified light scene is based on both the dynamic light scene and the second light scene, and such that, during the non-overlapping time period, the modified light scene is based on the dynamic light scene and based on one or more second lighting control settings of the second light scene.

6. The method of claim 1, wherein the second light scene has a duration longer than the upcoming time period, and wherein the modified light scene is generated such that its duration is shorter than the duration of the second light scene or substantially equal to the upcoming time period.

7. The method of claim 6, wherein the modified light scene is based on the intensity changes of the second light scene that occur during the duration of the second light scene, or wherein the modified light scene is based on the intensity changes of the second light scene that occur during the upcoming time period.

8. The method of claim 1, wherein the second light scene has a duration longer than the upcoming time period, and wherein the modified light scene is generated such that its duration is longer than the upcoming time period or substantially equal to the duration of the second light scene, and such that the modified light scene comprises an overlapping part wherein the dynamic light scene overlaps with the second light scene, and a non-overlapping time period wherein the second light scene does not overlap with the dynamic light scene, and such that, during the overlapping time period, the modified light scene is based on both the dynamic light scene and the second light scene, and such that, during the non-overlapping time period, the modified light scene is based on the second light scene and based on one or more second lighting control settings of the dynamic light scene.

9. The method of claim 1, wherein the input signal is indicative of:
 a selection of the second light scene via a user interface,
 a trigger of a sensor device, or
 an activation of a pre-programmed second light scene.

10. The method of claim 1, wherein the dynamic light scene comprises a first weight value and the second light scene comprise a second weight value, and wherein the generation of the modified light scene is further based on the first and second weight values.

11. A computer program product for a computing device, the computer program product comprising computer program code to perform the method of claim 1 when the computer program product is run on a processing unit of the computing device.

12. A control system for controlling one or more lighting devices, the control system comprising:
 a lighting controller configured to control the one or more lighting devices according to a dynamic light scene, wherein the dynamic light scene comprises first lighting control settings for controlling an intensity of light output of the one or more lighting devices, wherein the intensity changes over a time period,
 a receiver configured to receive an input signal indicative of an activation of a second light scene during the time period, wherein the second light scene comprises one or more second lighting control settings for changing the light output of the one or more lighting devices, wherein the second light scene is a second dynamic light scene comprising second lighting control settings for controlling a second intensity of the light output of the one or more lighting devices, wherein the second intensity changes over a second time period, and
 a processor configured to:
  analyze the dynamic light scene to determine the change of the intensity of the light output of the one or more lighting devices for an upcoming time period after the activation of the second light scene,
  analyze the second dynamic light scene to determine the change of the second intensity for the second time period,
  generate a modified light scene by combining the dynamic light scene and the second light scene based on the second light settings of the second light scene and the determined change of the intensity of the upcoming time period of the dynamic light scene such that the change of the intensity for the upcoming time period is relative to the change of the second intensity for the second time period, or vice versa, and
  control the one or more lighting devices according to the modified light scene during upcoming time period.

13. A controller for use in the control system of claim 12, wherein the controller comprises the receiver and the processor, and wherein the processor is configured to control the one or more lighting devices according to the modified light scene during upcoming time period by communicating the modified light scene to the lighting controller.

* * * * *